(12) United States Patent
Mishima et al.

(10) Patent No.: US 6,277,913 B1
(45) Date of Patent: Aug. 21, 2001

(54) THERMOPLASTIC RESIN COMPOSITION AND INTERIOR OR EXTERIOR PARTS FOR VEHICLE THEREOF

(75) Inventors: Ikuhiro Mishima, Kakogawa; Kazuhito Wada, Akashi, both of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/315,812

(22) Filed: May 21, 1999

(30) Foreign Application Priority Data

| | | | |
|---|---|---|---|
| May 25, 1998 | (JP) | ................................................. | 10-143236 |
| Aug. 31, 1998 | (JP) | ................................................. | 10-245897 |

(51) Int. Cl.$^7$ .................................................. C08L 51/08
(52) U.S. Cl. ................................ 525/70; 525/71; 525/63; 525/77; 525/80; 525/84; 525/85; 525/86; 525/87; 525/170; 525/183; 525/227; 525/228; 525/238; 525/241
(58) Field of Search ................................ 525/77, 80, 84, 525/85, 86, 87, 71, 70, 63, 170, 183, 238, 241, 227, 228

(56) References Cited

U.S. PATENT DOCUMENTS

| | | | |
|---|---|---|---|
| 2,887,464 | 5/1959 | Coover, Jr. et al. ................. | 260/45.5 |
| 3,055,859 | 9/1962 | Vollmert ............................... | 260/45.5 |
| 4,554,320 | * 11/1985 | Reimann .............................. | 525/183 |
| 4,812,516 | * 3/1989 | Maeda .................................... | 525/83 |
| 4,959,408 | 9/1990 | Grant .................................... | 524/523 |
| 5,047,478 | * 9/1991 | Ohmae ................................. | 525/183 |
| 5,231,138 | 7/1993 | Aonuma et al. ..................... | 525/179 |
| 5,376,712 | 12/1994 | Nakajima .............................. | 524/492 |

FOREIGN PATENT DOCUMENTS

| | | |
|---|---|---|
| 196 30 099 | 1/1998 | (DE) . |
| 0 619 328 | 10/1994 | (EP) . |
| 0 651 018 | 5/1995 | (EP) . |

OTHER PUBLICATIONS

Patent Abstracts of Japan, vol. 098, No. 013, Nov. 30, 1998 and JP10 219060A, Aug. 18, 1998.

* cited by examiner

*Primary Examiner*—Rachel Gorr
(74) *Attorney, Agent, or Firm*—Armstrong, Westerman, Hattori, McLeland & Naughton LLP

(57) ABSTRACT

There is provided a thermoplastic resin composition and interior or exterior parts for vehicle using thereof, which is excellent in flexibility, surface appearance, heat deformation property at heating and has low tackiness at a high temperature. The thermoplastic resin composition comprises 25 to 90 parts by weight of a (meth)acrylic ester copolymer (X), which is prepared by polymerizing 40 to 95% by weight of a (meth)acrylic ester, 0 to 40% by weight of a vinyl cyanide compound, not more than 60% by weight of an aromatic vinyl compound and 0 to 40% by weight of a monomer copolymerizable therewith, and has a glass transition temperature of not more than 20° C. and a gel content of not more than 50% by weight, 5 to 75 parts by weight of a copolymer (Y), which has a glass transition temperature or a melting point not less than 50° C., and 0 to 70 parts by weight of a graft copolymer (Z), which is prepared by polymerizing 5 to 95% by weight of a rubber polymer (A) and 5 to 95% by weight of a vinyl monomer (B), and wherein hardness thereof at 20° C. measured by the method of JIS K6301 is 30 to 100.

9 Claims, 1 Drawing Sheet

THERMOPLASTIC RESIN COMPOSITION AND INTERIOR OR EXTERIOR PARTS FOR VEHICLE THEREOF

BACKGROUND OF THE INVENTION

The present invention relates to a thermoplastic resin composition and interior or exterior parts for vehicles using thereof, which are excellent in flexibility, surface appearance, weatherability, moldability and heat deformation property and has low tackiness at a high temperature.

In recent years, a resin such as PVC, olefin or urethane is employed as a flexible resin in the field of an automobile, electric appliances for domestic use and OA apparatus, and the like. Among those, a flexible resin of PVC is widely employed as a flexible PVC. But a PVC flexible resin has a problem in weight loss at heating and migration of a plasticizer, since much plasticizer need to be added thereto. In a flexible resin other than PVC such as a flexible resin of styrene, a resin having a segment of isoprene, butadiene or the like was proposed. But it is on demerit especially in economy from the viewpoint of equipment and productivity, and has high tackiness at a high temperature, since it is a block copolymer of a hard segment and a soft segment and it need to be prepared by the particular polymerization method in a non-aqueous solvent. On the other hand an flexible resin of olefin is difficult to be applied and printed, and has a problem of a less surface modification property.

As to a resin of styrene, Japanese Unexamined Patent Publication No. 20346/1984 discloses a method of adding a particular plasticizer to a styrene resin reinforced by a rubber. But it is not sufficient because of volatilization of the plasticizer. As to a composition of an ABS resin and a copolymer of an acrylic ester, Japanese Unexamined Patent Publication No. 179257/1983 discloses a composition comprising a styrene resin containing a rubber and a copolymer of an acrylic ester copolymer, and Japanese Unexamined Patent Publication No. 17954/1988 discloses a composition comprising a copolymer of maleimide-styrene containing a rubber, an ABS resin and a copolymer of an acrylic ester copolymer. And it is described that a molded article of the composition is excellent in a chemical resistance. However, these compositions are remarkably lack in flexibility, the resin has not been obtained, which is excellent in flexibility, surface appearance, weatherability and heat deformation property at heating, and has low tackiness at a high temperature.

And Japanese Unexamined Patent Publication No. 27336/1996 discloses a composition comprising a maleimide-styrene copolymer containing a rubber and an acrylic ester copolymer. But the resin has not been obtained, which is excellent in flexibility as the composition of the present invention.

Many graft copolymers (rubber) of ABS resin (of which matrix is a copolymer of styrene and acrylonitrile or a copolymer of styrene, acrylonitrile and maleimide) have been proposed, but there has been proposed no graft copolymers (rubber), which is suitable to a resin comprising a copolymer of maleimide-styrene-acrylonitrile and a copolymer of an acrylic ester.

An object of the present invention is to provide a thermoplastic resin composition and interior or exterior parts for vehicles molded thereof, which has no problems mentioned-above, is excellent in flexibility, surface appearance, weatherability, moldability and heat deformation property, and has low tackiness at a high temperature.

SUMMARY OF THE INVENTION

The present inventors consider that it is necessary to employ a (meth)acrylic ester copolymer (X) having the glass transition temperature not more than 20° C. in order to keep flexibility of a thermoplastic resin composition. And the present inventors also consider that it is necessary not to completely compatibilize a (meth)acrylic ester copolymer (X) and copolymer (Y) in order to give an elasticity to the thermoplastic resin composition, and to have a particular phase structure, in which a micro phase separation of matrix comprising a (meth)acrylic ester (X) and a copolymer having a high glass transition temperature or a high melting point is delicately controlled. In an occasion, it is considered to suitably employ an graft copolymer (Z) or to gently cross-link a copolymer of (meth)acrylic ester (X).

The present inventors have made intensive studies to attain the above-mentioned object and as a result, have found that a thermoplastic resin composition comprising a particular copolymer of (meth)acrylic ester (X), a copolymer (Y) having the glass transition temperature or the melting point of not less than 50° C., and an optional graft copolymer (Z) is excellent in flexibility, surface appearance, weatherability and heat deformation property, and has low tackiness at a high temperature.

Namely, the present invention relates to a thermoplastic resin composition comprising 25 to 90 parts by weight of a (meth)acrylic ester copolymer (X), which is prepared by polymerizing 40 to 95% by weight of a (meth)acrylic ester, 0 to 40% by weight of a vinyl cyanide compound, not more than 60% by weight of an aromatic vinyl compound and 0 to 40% by weight of a monomer copolymerizable therewith, and has a glass transition temperature of not more than 20° C. and a gel content of not more than 50% by weight, 5 to 75 parts by weight of a copolymer (Y), which has a glass transition temperature or a melting point not less than 50° C., and 0 to 70 parts by weight of a graft copolymer (Z), which is prepared by polymerizing 5 to 95% by weight of a rubber polymer (A) and 5 to 95% by weight of a vinyl monomer (B), wherein the total weight of the copolymers (X), (Y) and (Z) is 100 parts by weight, and wherein hardness thereof at 20° C. measured by the method of JIS K6301 is 30 to 100 (claim 1), the thermoplastic resin composition of claim 1, wherein the content of the graft copolymer (Z) is 5 to 65 parts by weight (claim 2), the thermoplastic resin composition of claim 1, wherein the copolymer (Y) is at least one thermoplastic resin selected from the group consisting of a styrene resin, a vinyl chloride resin, an acrylic resin, polycarbonate, an amide resin, an ester resin and an olefin resin (claim 3), the thermoplastic resin composition of claim 1, wherein the copolymer (Y) is a styrene resin which is prepared by polymerizing 0 to 40% by weight of a vinyl cyanide compound, 10 to 95% by weight of an aromatic vinyl compound, 0 to 50% by weight of maleimide monomer and 0 to 40% by weight of a monomer copolymerizable therewith, wherein the total percentage being 100 (claim 4), the thermoplastic resin composition of claim 1, wherein the graft copolymer (Z) is prepared by polymerizing 5 to 95 parts by weight of at least one rubber polymer (A) selected from the group consisting of a diene rubber polymer, an olefin rubber polymer, an acrylic rubber polymer and a silicone rubber polymer, which has a volume average particle size of 30 to 2,000 nm, and 5 to 95 parts by weight of a monomer mixture comprising 5 to 90% by weight of an aromatic vinyl compound, 10 to 95% by weight of at least one monomer selected from the group consisting of a (meth)acrylic ester and a vinyl cyanide compound, and 0 to 30% by weight of a monomer copolymerizable therewith, wherein the total percentage being 100 (claim 5), interior or exterior parts for vehicles comprising 25 to 90 parts by weight of a (meth)acrylic ester copolymer (X), which has a glass transition temperature of not more than 20° C. and a gel content of not more than 50% by weight, 5 to 75 parts by weight of a copolymer (Y) which has a glass transition temperature of not less than 50° C., and 0 to 70 parts by weight of a graft copolymer (Z), which is prepared by polymerizing 5 to 95% by weight of a rubber polymer (A) and 5 to 95% by weight of a vinyl monomer (B), and wherein surface hardness of an article molded thereof measured by the method of JIS K6301 at 20° C. is 30 to 100 (claim 6), the interior or exterior parts for vehicles of claim 6, wherein the (meth)acrylic ester copolymer (X) is prepared by polymerizing 40 to 95% by weight of a (meth)acrylic ester, 0 to 60% by weight of an aromatic vinyl compound, 0 to 40% by weight of a vinyl cyanide compound, and 0 to 40% by weight of a monomer copolymerizable therewith (claim 7), the interior or exterior parts for vehicles of claim 6, wherein the copolymer (Y) is prepared by polymerizing 10 to 95% by weight of an aromatic vinyl compound, 0 to 45% by weight of a vinyl cyanide compound, 0 to 50% by weight of a maleimide monomer and 0 to 40% by weight of a monomer copolymerizable therewith (claim 8), the interior or exterior parts for vehicles of claim 6, wherein the graft copolymer (Z) is prepared by polymerizing 5 to 95 parts by weight of at least one rubber polymer (A) selected from the group consisting of a diene rubber polymer, an olefin rubber polymer, an acrylic rubber polymer and a silicone rubber polymer, which has a volume average particle size of 30 to 2,000 nm, and 5 to 95 parts by weight of a vinyl monomer (B) comprising 5 to 90% by weight of an aromatic vinyl compound, 10 to 95% by weight of at least one monomer selected from the group consisting of a (meth)acrylic ester and a vinyl cyanide compound, and 0 to 30% by weight of a monomer copolymerizable therewith (claim 9).

DETAILED DESCRIPTION

Figure 1:
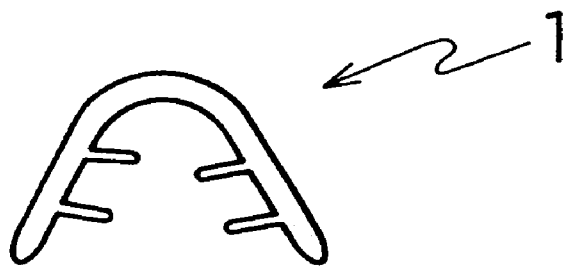
FIG. 1 is a cross sectional view of interior parts for vehicles (molded trim of automobiles) prepared in Examples 12 to 17 and Comparative Examples 10 to 14.

In the present invention a (meth)acrylic ester copolymer (X) is especially important, said component is employed to express flexibility and maintain surface hardness of the molded article in a preferred range.

A glass transition temperature of a (meth)acrylic ester copolymer (X) is not more than 20° C., preferably –80 to 15° C., more preferably –70 to 10° C. If the glass transition temperature is above 20° C., flexibility becomes remarkably lowered.

Glass transition temperatures (Tg) of the present invention are the values described in "Polymer Handbook", and glass transition temperatures of copolymer are calculated by using the Fox equation.

From the viewpoint of flexibility, processability, surface appearance and tackiness, a (meth)acrylic ester copolymer is a copolymer prepared by polymerizing 40 to 95% by weight, preferably 40 to 90% by weight, more preferably 50 to 90% by weight of a (meth)acrylic ester, 0 to 40% by weight, preferably 5 to 35% by weight, more preferably 10 to 33% by weight of a vinyl cyanide compound, not more than 60% by weight, preferably not more than 45% by weight, more preferably 2 to 32% by weight of an aromatic vinyl compound, and 0 to 40% by weight, preferably 0 to 20% by weight, more preferably 0 to 15% by weight of a monomer copolymerizable therewith, wherein the total percentage is 100% by weight.

From the viewpoint of flexibility, a gel content of the (meth)acrylic ester (X) is not more than 50% by weight. The gel content is calculated by the equation (weight of filtered residue)/(weight of sample before filtration)×100(%), 2% by weight of methyl ethyl ketone solution is kept at 23° C. for 24 hours, the solution is filtered by using 100 mesh wire net and filtered residue is dried. From the viewpoint of surface appearance and processability, the gel content is preferably not more than 30% by weight, more preferably not more than 20% by weight, and particularly preferable not more than 10% by weight. If the content is beyond 50% by weight, processability and surface appearance become remarkably lowered.

A reduced viscosity (measured at 30° C. in N,N-dimethyl formamide solution) of the (meth)acrylic ester (X) soluble in methyl ethyl ketone is preferably 0.3 to 0.5 dl/g, more preferably 0.4 to 4.0 dl/g, particularly preferably 0.45 to 3.0 dl/g, from the viewpoint of tensile strength, processability and surface appearance.

As a (meth)acrylic ester, examples are alkyl (meth) acrylate having 1 to 18 carbon atoms of alkyl group such as methyl (meth)acrylate, ethyl (meth)acrylate, butyl (meth) acrylate, 2-ethylhexyl (meth)acrylate, lauryl (meth)acrylate, or stearyl (meth)acrylate; 2-hydroxyethyl (meth)acrylate, and glycidyl (meth)acrylate. Among those butyl (meth) acrylate is preferable from the viewpoint of industrial point of view. These may be employed solely or in a combination of two or more thereof.

As a vinyl cyanide compound, examples are acrylonitrile, methacrylonitrile and the like. Among those acrylonitrile is preferable from the viewpoint of industrial point of view. These may be employed solely or in a combination of two or more thereof.

As an aromatic vinyl compound, examples are styrene, α-methylstyrene, p-methylstyrene, vinylnaphthalene, chlorostyrene, bromostyrene and the like. Among those styrene is preferable from the viewpoint of an industrial point of view. These may be employed solely or in a combination of two or more thereof.

As a copolymerizable monomer, examples are a maleimide monomer such as maleimide, N-methylmaleimide, N-ethylmaleimide, N-propylmaleimide, N-butylmaleimide, N-phenylmaleimide or N-(p-methylphenyl)maleimide; (meth)acrylic acid, 2-hydroxyethyl (meth)acrylate and the like. These may be employed solely or in a combination of two or more thereof.

A copolymer (Y) of the present invention is a component employed to prevent tackiness at a high temperature and to maintain heat deformation property.

A glass transition temperature or a melting point (Mp) of a copolymer (Y) is not less than 50° C., preferably not less than 70° C., more preferably not less than 80° C., particularly preferably not less than 90° C. If the glass transition temperature or the melting point is below 50° C., heat deformation property, flexibility and tackiness become lowered. From the view point of an economical point of view, the copolymer(Y) is preferably the copolymer selected from the group consisting of a styrene resin, a vinyl chloride resin, an acrylic resin, polycarbonate, an amide resin, an ester resin and an olefin resin.

As a styrene resin, examples are polystyrene, a styrene-acrylonitrile copolymer, an α-methylstyrene-acrylonitrile copolymer, a styrene- α-methylstyrene-acrylonitrile copolymer, a styrene-maleimide copolymer, a styrene-maleimide-acrylonitrile copolymer, a styrene-α-methylstyrene-maleimide-acrylonitrile copolymer, a styrene-maleic anhydride copolymer and the like. From the viewpoint of impact resistance, processability, tensile strength and surface appearance, a styrene resin is preferably the resin prepared by polymerizing at least one monomer selected from the group consisting of a vinyl cyanide compound, an aromatic vinyl compound, a (meth)acrylate and a maleimide compound, wherein a reduced viscosity (measured at 30° C. in N,N-dimethyl formamide solution) of the portion soluble in methyl ethyl ketone is preferably 0.3 to 2.0 dl/g, more preferably 0.4 to 1.5 dl/g, particularly preferably 0.45 to 1.2 dl/g.

From the viewpoint of mechanical properties such as tensile strength, surface appearance, tackiness and processability, a copolymer (B) is preferably a styrene resin prepared by polymerizing 0 to 45% by weight, preferably 10 to 40% by weight of a vinyl cyanide compound, 10 to 95% by weight, preferably 10 to 85% by weight of an aromatic vinyl compound, 0 to 50% by weight, preferably 5 to 45% by weight of a maleimide monomer, and 0 to 40% by weight, preferably 0 to 20% by weight of a monomer copolymerizable therewith, wherein the percentage is 100% in total.

As a vinyl cyanide compound employed for preparation of copolymer (B), examples are acrylonitrile, methacrylonitrile and the like. As an aromatic vinyl compound employed for preparation of copolymer (B), examples are styrene, a -methylstyrene, p-methylstyrene, p-isopropylstyrene, chlorostyrene, bromostyrene, vinylnaphthalene and the like. As a maleimide monomer employed for preparation of copolymer (B), examples are maleimide, N-methylmaleimide, N-ethylmaleimide, N-propylmaleimide, N-butylmaleimide, N-phenylmaleimide, N-(p-methylphenyl)maleimide and the like. From the viewpoint of an industrial point of view, a vinyl cyanide compound is more preferably acrylonitrile, an aromatic vinyl compound is more preferably styrene, and a maleimide monomer is more preferably N-phenylmaleimide. These may be employed solely or in a combination of two or more thereof.

As a copolymerizable monomer, examples are (meth) acrylic acid, (meth)acrylic ester monomer of methyl, ethyl, propyl, butyl,2-hydroxyethyl, 2-ethylhexyl, gricidyl, and the like. These may be employed solely or in a combination of two or more thereof.

As a vinyl chloride resin, examples are poly(vinyl chloride), a copolymer of not less than 80% by weight of vinyl chloride and not more than 20% by weight of another copolymerizable vinyl monomer such as ethylene, post-chlorinated poly(vinyl chloride), and the like. Polymerization degree of the vinyl chloride resin is preferably 300 to 2000, more preferably 400 to 1500, particularly preferable 450 to 1300 from the viewpoint of mechanical property and processability.

As a polycarbonate, examples are a polycarbonate of bis-phenol-A and the like. From the viewpoint of mechanical property and processability a number average molecular weight thereof is preferably 1000 to 100000, more preferably 5000 to 80000, particularly preferable 10000 to 60000.

As an ester resin, examples are poly(ethylene terephthalate), poly(butylene terephthalate), and the like. From the viewpoint of mechanical property and processability a number average molecular weight thereof is preferably 1000 to 100000, more preferably 5000 to 80000, particularly preferably 10000 to 60000.

As an amide resin, examples are nylon-6, nylon-6,6, nylon-12 and the like. From the viewpoint of mechanical property and processability a number average molecular weight thereof is preferably 1000 to 100000, more preferably 5000 to 80000, particularly preferably 10000 to 60000.

As an olefin resin, examples are polypropylene, polyethylene, cyclic polyolefin and the like.

A polymer alloy comprising at least one thermoplastic resin selected from the group consisting of a styrene resin, a vinyl chloride resin, a carbonate resin, an ester resin, an amide resin and an olefin resin mentioned above, can be preferably employed. Examples are an alloy of a styrene-acrylonitrile copolymer and a vinyl chloride resin, an alloy of a styrene-acrylonitrile copolymer and polycarbonate, an alloy of a styrene-acrylonitrile copolymer and nylon-6, an alloy of poly(ethylene terephthalate) and polycarbonate, an alloy of polystyrene and poly(phenylene oxide) and the like.

A graft copolymer (Z) employed optionally in the present invention is a component employed for mechanical property such as tensile strength, and it is a graft-polymer of a vinyl monomer (B) to a rubber polymer (A).

A rubber polymer (A) employed in the preparation of a graft copolymer (Z) is at least one rubber polymer selected from the group consisting of a diene rubber polymer, an olefin rubber polymer, an acrylic rubber polymer and a silicone rubber polymer, wherein a volume average particle size thereof is preferably 30 to 2000 nm, more preferably 50 to 1500 nm, particularly preferably 80 to 1000 nm. If the volume average particle size is below 30 nm or above 2000 nm, mechanical property such as tensile strength tends to become lowered. The rubber polymer (A) may be the polymer prepared by mixing not less than 2 kinds of the polymer (A) having a different volume average particle size.

Examples of the rubber polymer (A) are a diene rubber polymer such as a polybutadiene rubber, a styrene-butadiene rubber, an acrylonitrile-butadiene rubber, a butadiene-acrylic ester rubber, a hydrogenated styrene-butadiene rubber; polyolefin such as an ethylene-propylene rubber, an ethylene-propylene-diene rubber; an acrylic rubber polymer such as a polyacrylic ester rubber and an ethylene-acrylic ester rubber; a silicone rubber polymer such as a poly (dimethyl siloxane) rubber and a poly(dimethyl siloxane)-acryl composite rubber. These may be employed solely or in a combination of two or more thereof. Among those, the rubber is preferably a rubber containing not less than 25% by weight, more preferably not less than 40% by weight of an acrylic rubber polymer such as a poly(acrylic ester) rubber or a silicone rubber polymer from the viewpoint of weatherability.

There is no particular limitation for the method by which a volume average particle size of a rubber polymer (A) is made in the preferable range. Though a method obtaining a rubber polymer having an enhanced particle size by using a latex (S) containing an acid functional group is preferable from the viewpoint of controlling particle size, impact strength and surface appearance.

A rubber polymer (A) is preferably the rubber polymer prepared by the preparation method obtaining a rubber polymer having an enhanced particle size by using 0.1 to 10 parts by weight of a latex (S) containing an acid functional group obtained by polymerizing 5 to 50% by weight of at least one unsaturated acid (c) selected from the group consisting of acrylic acid, methacrylic acid, itaconic acid and crotonic acid, 50 to 95% by weight of at least one alkyl (meth)acrylate (d) having 1 to 12 carbon atoms of an alkyl group, and 0 to 40% by weight of a monomer copolymerizable with (c) or (d), based on 100 parts by weight (solid) of a rubber latex.

A vinyl monomer (B) employed for the preparation of a graft copolymer (Z) is a monomer mixture comprising preferably 5 to 90% by weight, more preferably 10 to 85% by weight, particularly preferably 15 to 80% by weight of an aromatic vinyl compound, preferably 10 to 95% by weight, more preferably 15 to 90% by weight, particularly preferably 20 to 85% by weight of at least one monomer selected from the group consisting of a (meth)acrylic ester and a vinyl cyanide compound, and preferably 0 to 30% by weight, more preferably 0 to 20% by weight, particularly preferably 0 to 15% by weight of a monomer copolymerizable therewith, wherein the total percentage being 100. If the range is below or above the above-mentioned value, mecanical property and processability tend to become lowered.

As a vinyl cyanide compound of a graft copolymer (Z), examples are acrylonitrile, methacrylonitrile and the like. As an aromatic vinyl compound, examples are styrene, α-methylstyrene, p-methylstyrene, p-isopropylstyrene, chlorostyrene, bromostyrene, vinylnaphthalene and the like. From the viewpoint of an industrial point of view, a vinyl cyanide compound is more preferably acrylonitrile, an aromatic vinyl compound is more preferably styrene. As a (meth)acrylic ester, examples are methyl (meth)acrylate, ethyl (meth)acrylate, butyl (meth)acrylate, 2-ethylhexyl (meth)acrylate, 2-hydroxyethyl (meth)acrylate, glycidyl (meth)acrylate and the like. Among those methyl methacrylate as a (meth)acrylic ester is preferable from the viewpoint of an industrial point of view. These may be employed solely or in a combination of two or more thereof. As a copolymerizable monomer, examples are a maleimide monomer such as maleimide, N-methylmaleimide, N-ethylmaleimide, N-propylmaleimide, N-butylmaleimide, N-phenylmaleimide or N-(p-methylphenyl)maleimide; (meth)acrylic acid and the like. These may be employed solely or in a combination of two or more thereof.

A ratio of a rubber polymer (A) and a vinyl monomer (B) in the preparation of a graft copolymer (Z) is 5 to 95 parts by weight, preferably 10 to 90 parts by weight, more preferably 15 to 85 parts by weight of a rubber polymer (B), based on 5 to 95 parts by weight, preferably 10 to 90 parts by weight, more preferably 15 to 85 parts by weight of a rubber polymer (A), wherein the total parts being 100 parts. If the ratio of the rubber polymer (A) becomes too small, flexibility and impact resistance become lowered. On the other hand, if the ratio becomes too large, surface appearance and heat deformation property become lowered.

A thermoplastic resin composition of the present invention comprises 25 to 90 parts by weight, preferably 30 to 85 parts by weight from the viewpoint of flexibility, more preferably 33 to 83 parts by weight of a (meth)acrylic ester copolymer (X), 5 to 75 parts by weight, preferably 10 to 70 parts by weight, more preferably 17 to 67 parts by weight of a copolymer (Y), and 0 to 70 parts by weight, preferably 5 to 65 parts by weight, more preferably 15 to 63 parts by weight of a graft copolymer (Z), wherein the sum of (X), (Y) and (Z) being 100 parts by weight. If the range is below or above the above-mentioned value, flexibility, heat deformation property and tackiness become lowered.

In the thermoplastic resin composition of the present invention, hardness at 20° C. measured by the method of JIS K6301 is the most important. The hardness at 20° C. of the thermoplastic resin composition measured by the method of JIS K6301 is 30 to 100, preferably 40 to 100 from the viewpoint of flexibility, more preferably 45 to 97.

There is no particular limitation for preparation method of a (meth)acrylic ester copolymer (X), a copolymer (Y) and a graft copolymer (Z), a polymerization initiator, a chain transfer agent, an emulsifier (surfactant), as long as the composition of the present invention is obtained. Examples of the preparation method are a conventional block polymerization, a solution polymerization, a suspension polymerization, an emulsion polymerization, a emulsion-suspension polymerization, an emulsion-block polymerization and the like. The preparation method of a graft copolymer (Z) is preferably the emulsion polymerization from the viewpoint of controlling graft ratio. And from the viewpoint of controlling a micro-structure and industrial point of view, the emulsion polymerization is preferable in every cases of a (meth)acrylic ester copolymer(X), a copolymer (Y) and a graft copolymer (Z).

If a (meth)acrylic ester copolymer (X) and a copolymer (Y) are polymerized by the emulsion polymerization, these are preferably prepared in the same polymerization reactor from the viewpoint of productivity and deformability at heating. The method of polymerizing a copolymer (Y) after polymerizing a (meth)acrylic ester copolymer (X), or the method of polymerizing the rest of the copolymer (Y) after polymerizing a part of the copolymer (Y) following a (meth)acrylic ester copolymer (X) are particularly preferable.

There is no particular limitation for a polymerization initiator, a chain transfer agent, an emulsifier, as long as the composition of the present invention is obtained. As a polymerization initiator, a cconventional initiator can be employed. Examples thereof are a thermal decomposition initiator such as potassium persulfate, and a redox initiator such as Fe-reducing agent-an organic peroxide. There can be employed a conventional chain transfer agent such as t-dodecylmercaptan, n-dodecylmercaptan, α-methylstyrene dimer, terpinolene. There can be employed a conventional emulsifier such as a fatty acid metal salt such as sodium oleate, sodium paltimate or sodium rhodionate, and a sulfonate metal salt such as sodium dodecylbenzene sulfonate or sodium alkylsulfonate having 12 to 20 carbon atoms, or sodium dioctylsulfosuccinate.

To a thermoplastic resin composition of the present invention there can be suitably added a polymer other than a (meth)acrylic ester copolymer (X), a copolymer (Y) and a graft copolymer (Z). Examples thereof are a conventional rubber polymer such as a conventional thermoplastic elastomer (NBR (nitrile butadiene rubber), a styrene thermoplastic elastomer such as a styrene-butadiene block copolymer, an olefinic thermoplastic elastomer, a vinyl chloride thermoplastic elastomer, a urethane thermoplastic elastomer, an ester thermoplastic elastomer, an amide thermoplastic elastomer, and the like), another thermoplastic resin such as poly(phenylene oxide), poly(phenylene sulfide), polysulfone, polyarylate, poly(ether ketone) or polyimide, and a thermosetting resin such as a phenolic resin.

To a thermoplastic resin composition of the present invention there can be suitably added an antioxidant, a thermal stabilizer, an ultraviolet absorbent, a pigment, an antistatic agent, and a lubricant. In order to express an excellent performance as a molding resin, there can be suitably added an stabilizer (containing phenolic structure, sulfur, phosphor and hindered amine) employed for a styrene resin, an antioxidant, an ultraviolet absorbent (benzophenone and benzotriazole), an internal lubricant and external lubricant (polyorganosiloxane, an aliphatic hydrocarbon, an ester of a higher fatty acid and a higher alcohol, an amide or a bisamide of a higher fatty acid, a modifier of a higher fatty acid, an oligoamide, metal salts of a fatty acid). These may be employed solely or in a combination of two or more thereof.

The resin composition comprising a (meth)acrylic ester (X), a copolymer (Y) and a graft copolymer (Z) can be prepared by mixing these polymers in the state of a latex, a slurry, a solution, a powder, a pellet or the combination thereof. If recovering a polymer powder from a latex of a (meth)acrylic ester copolymer (X) after polymerization, a latex of copolymer (Y), and/or a latex of a graft copolymer (Z), there can be employed a conventional method. Examples thereof are the method that the powder is dehydrated and dried after the latex is solidified by adding an alkaline-earth metal salt such as calcium chloride, magnesium chloride, magnesium sulfate, an alkaline metal salt such as sodium chloride and sodium sulfate, an inorganic or organic acid such as hydrochloric acid, sulfuric acid, phosphoric acid and acetic acid. Spray drying method can be also employed. A part of an stabilizer can be added to a latex or a slurry of these resin in state of a dispersion solution.

The thermoplastic resin composition of the present invention can be obtained by mixing the above-mentioned stabilizer, optionally a lubricant and a pigment into a powder or a pellet comprising at least one mixture selected from the group consisting of a (meth)acrylic ester copolymer (X), a copolymer (Y) and a graft copolymer (Z), and then by kneading by using a conventional melt-mixer such as a banbury mixer, a roll mill, an extruder with one screw or an extruder with two screws.

The thermoplastic resin composition of the present invention can be formed by a conventional molding method such as injection molding, extrusion (film extrusion, sheet forming, contour extrusion), blow forming, vacuum forming, calendering, compression molding, transfer molding, thermoforming, flow molding, laminate molding and the like.

The thermoplastic resin composition of the present invention can be applied to an application in which a flexible resin is required in the field of automobile, rail vehicle, electric appliances for domestic use, building material and the like. Especially, it is most applicable in the field in which poly(vinyl chloride) is employed.

For example, in the field of automobile and rail vehicle, examples are facings of interior parts such as a facing of an instrument panel, a facing of a pillar, a facing of a console box, a welt, a gearshift lever, a gearshift lever knob, a change knob, an automatic knob, a stearing wheel, a horn pad, an arm rest cover, a head rest cover, an assist grip, a door grip, a parking grip, a control cable cover, a facing of ceiling; exterior parts such as an outer mogol (molding), a side mogol (molding), a mud guard, a weather strip, a glass run channel, a bumper, an air dump skirt, a mud flap ; seals such as a roof packing, a door mirror packing, a cutwater, a window packing; a drain tube, a grommet, a trunk cover, harness parts and the like.

In the field of electric appliances for domestic use, examples thereof are a coat sheath, a cable sheath, a box cover, a packing of a vacuum-cleaner, a hose of an air conditioner, a gasket of a refrigerator, a hose of an automatic dishwasher, and the like.

In the field of building material, examples thereof are a handrail cover, a packing of glass sealing, a packing of a window frame, a packing of a bath unit, a cover of an air-conditioner plumbing, an industrial packing, seal material of a door, joint material of tile, a waterproofing sheet, various gaskets, and the like.

And examples thereof are hoses such as a gardening hose, an industrial hose and a hose of a shower, tubes, stationary goods, sporting goods, grips, and the like.

Thermoplastic resin compositions and interior or exterior parts for vehicle using thereof of the present invention are explained concretely by means of Examples, but the Examples do not limit the present invention. "Parts" in Examples means "parts by weight" unless otherwise specified.

Components and abbreviations thereof used in Preparation Examples, Examples and Comparative Examples are as mentioned below.

BA: butyl acrylate
MMA: methyl methacrylate
2EHA: 2-ethylhexyl acrylate
GMA: glycidyl methacrylate
BMA: butyl methacrylate
St: styrene
αMSt: α-methylstyrene
AN: acrylonitrile
PMI: N-Phenylmaleimide
MAA: methacrylic acid
BDM: butylene dimethacrylate
ALM: allyl methacrylate
TDM: t-dodecyl mercaptan
CHP: cumene hydroperoxide
EDTA: ethylene-diamine-tetraacetic acid
TAC: triallyl cyanurate
DSN: sodium dioctyl sulfosuccinate Evaluation items and evaluation methods used in Preparation Examples, Examples and Comparative Examples are shown below.

[Measurement of Tg (glass transition temperature)]
Glass transition temperature or melting point of an acrylic ester copolymer (X) and a copolymer (Y) was measured by DSC (SSC5200 type, made by Seiko Densi Kogyo Kabusiki Kaisha).

[Calculation of Tg (glass transition temperature)]
Tg of an acrylic ester copolymer (X) and Tg of a copolymer (Y) were calculated by a Fox equation using Tg of homopolymer (values in references).

[Measurement of molecular weight and polymerization degree]
As values (number average molecular weight) of polycarbonate, polyester and nylon6, values in technical documents of these polymers on the market were employed.

[Measurement of a gel content]
To a latex of (meth)acrylic ester copolymer (X) and a graft copolymer (Z) was added calcium chloride to coagulate. 2% methyl ethyl ketone solution of a resin powder was prepared using a resin powder obtained by heating and drying a coagulated slurry. The solution was kept at 23° C. for 24 hours and was filtered using a 100 mesh wire net. After drying the filtered residue, the gel content was measured. Measured values are represented by the formula, (filtered residue by weight/original weight)×100(%).

[Measurement of reduced viscosity]

To a latex of (meth)acrylic ester copolymer (X) and a copolymer (Y) was added calcium chloride to coagulate. 0.3 g/dl N,N-dimethyl formamide solution of a resin powder was prepared using a resin powder obtained by heating and drying a coagulated slurry, and the reduced viscosity was measured at 30° C.

If a (meth)acrylic ester copolymer (X) is prepared at a first stage and a copolymer (Y) is prepared in the same polymerization reactor at the second stage, after measuring the reduced viscosity at 30° C. by using 0.3 g/dl N,N-dimethyl form amide solution prepared by a powder of a resin mixture compising a (meth)acrylic ester copolymer (X) and a copolymer (Y), which is obtained by heating and drying a coagulated slurry, the reduced viscosity of the copolymer (Y) was calculated as average by using the reduced viscosity of a (meth)acrylic ester copolymer (X) and the reduced viscosity of the resin mixture of a (meth)acrylic ester copolymer (X) and a copolymer (Y).

[Graft ratio of graft copolymer]

In methyl ethyl ketone was dissolved a powder of a graft copolymer (Z) and the resulting solution was centrifuged into a methyl ethyl ketone-soluble portion and a methyl ethyl ketone-insoluble portion. A graft ratio was calculated according to the ratio of the soluble and insoluble portions.

[Particle size of a rubber polymer]

Particle size of a latex of a rubber copolymer (A) was measured by using Nycomp particle size measuring machine made by Pacific Science Co., or by Microtrack UPA particle size measuring machine made by Kabushiki Kaisha Nikkiso.

[Polymerization conversion]

A polymerization conversion was calculated by using a solid concentration.

[Property of a thermoplastic resin composition]

Hardness was measured at 20° C. based on the JIS K6301 standard.

Permanent compressive strain was measured after compression at 70° C. for 22 hours based on the JIS K6301 standard.

Tensile strength (kg/cm$^2$) and tensile elongation (%) was evaluated by using a No. 1 dumbbell based on the ASTM D638 standard.

Heat deformation property at heating, was evaluated by observing deformation after keeping a dumbbell in a dryer at 80° C. for 8 hours.

○ (no change was observed)
X (distinct change was observed)

Moldability was evaluated by easiness of filling at injection molding.

○ (filling was comparatively easy)
X (filling was difficult)

Test pieces used in the measurement of hardness, tensile strength, tensile elongation and heat deformation property were molded at the same cylinder temperature as that of an extrusion pellet using FAS100B injection molding machine available from Kabushiki Kaisha Fanuc Ltd. to evaluate them. Test pieces used in the measurement of permanent compressive strain were prepared to a regular form by injection molding, compression molding and cutting.

[Property of interior parts of vehicles]

The following tests at a room temperature and a high temperature were carried out by using trim molded articles for automobiles prepared in Examples 12 to 17 and Comparative Examples 10 to 14.

Tests at a room temperature:

Surface appearance was evaluated by visibly observing whether there were patches of gloss and lines.

○ (appearance was good)
X (appearance was bad)

Tackiness was evaluated by touching.

○ (adhisiveness was found)
X (tackiness was not found)

Tests at a high temperature

After keeping trim molded articles in a dryer at 80° C. for 8 hours, surface appearance and tackiness were evaluated in the same manner as described above, and shape change was observed.

○ (shape change was not found)
X (shape change was found)

[Property of exterior parts of vehicles]

By using drip rail moldings of automobiles prepared in the following Examples 18 to 23 and Comparative Examples 15 to 19, surface appearance was evaluated at a room temperature in the same manner as described above, and the following tests at a high temperature and weatherability tests were carried out.

Tests at a high temperature:

After keeping drip rail moldings in a dryer at 80° C. for 8 hours, tackiness and shape change were evaluated in the same manner as described above.

Weatherability tests

By using a sunshine weatherometer (63° C., with rain) available from Kabushiki Kaisha Suga Shikenki, weatherability was evaluated by visibly observing surface change and color difference after 500 hours.

○ (surface roughness was not found)
X (surface roughness was found)

A color difference was calculated by Hunter equation ΔE.

The following "parts" and "%" in Examples and Comparative Examples represent parts by weight and % by weight respectively.

PREPARATION EXAMPLE 1

Preparation of (meth)acrylic Ester Copolymer (X)

A reactor equipped with a stirrer, a condenser, a nitrogen feeding port, a monomer feeding port and a thermometer was charged with 250 parts of pure water, 1.0 part of DSN, 0.5 part of sodium formaldehydesulfoxylate, 0.01 part of EDTA, and 0.0025 part of ferrous sulfate.

The reactor was heated to 65° C. in the nitrogen stream with stirring. After reaching 65° C., to the reactor was continuously added dropwise a mixture comprising 65 parts of BA, 28 parts of AN, 7 parts of St, 0.25 part of tDM and 0.3 part of CHP for seven hours.

At one hour and three hours after starting of DSN adding, respectively 0.5 part of DSN was additionally added.

After adding, stirring was continued at 65° C. for one hour and the polymerization was completed to prepare the copolymer (X-1). The properties thereof were evaluated. Table 1 shows the results with the composition of monomer.

PREPARATION EXAMPLES 2 TO 14

Preparation of (meth)acrylic Ester Copolymer (X)

In the same manner as in copolymer (X-1), copolymers (X-2) to (X-14) were prepared by using monomer mixture of which composition was shown in Table 1. The properties thereof were evaluated. Table 1 shows the results.

TABLE 1

| | (Meth) acrylic ester copolymer (X) | | | | | | | | | | | | | |
|---|---|---|---|---|---|---|---|---|---|---|---|---|---|---|
| | X-1 | X-2 | X-3 | X-4 | X-5 | X-6 | X-7 | X-8 | X-9 | X-10 | X-11 | X-12 | X-13 | X-14 |
| | Composition (Parts) | | | | | | | | | | | | | |
| BA | 65 | 45 | 40 | 50 | 60 | 30 | 50 | 100 | 75 | 40 | 60 | 70 | 25 | 100 |
| 2EHA | — | 30 | 10 | 25 | 15 | — | — | — | — | 15 | 10 | — | — | — |
| BMA | — | — | 10 | — | — | — | — | — | — | — | 10 | — | — | — |
| MMA | — | — | — | — | — | — | — | — | — | — | — | 30 | — | — |
| GMA | — | — | — | — | 5 | — | — | — | — | — | — | — | — | — |
| St | 7 | 3 | 16 | 3 | 3 | 65 | 5 | — | 5 | 15 | 5 | — | 30 | — |
| AN | 28 | 22 | 24 | 22 | 17 | 5 | 45 | — | 20 | 30 | 15 | — | 45 | — |
| BDM | — | — | 0.005 | — | — | — | — | — | — | — | 0.007 | — | — | — |
| ALM | — | — | — | 0.03 | — | — | — | 2 | — | — | — | — | — | 2.5 |
| tDM | 0.25 | 0.25 | 0.25 | 0.25 | 0.25 | 0.25 | 0.25 | — | 0.30 | 0.35 | 0.25 | 0.30 | 0.30 | — |
| CHP | 0.3 | 0.3 | 0.3 | 0.3 | 0.3 | 0.3 | 0.3 | 0.3 | 0.3 | 0.3 | 0.3 | 0.3 | 0.3 | 0.3 |
| Polymerization conversion (%) | 97 | 99 | 99 | 98 | 98 | 98 | 92 | 99 | 99 | 98 | 99 | 98 | 94 | 99 |
| Gel content (%) | 0 | 0 | 7 | 18 | 2 | 0 | 0 | 94 | 0 | 0 | 8 | 0 | 0 | 95 |
| Reduced Viscosity (dl/g) | 0.65 | 0.56 | 0.81 | 1.16 | 0.73 | 0.63 | 0.55 | — | 0.61 | 0.54 | 0.78 | 0.58 | 0.62 | — |
| Tg (° C.) (Measured) | −15 | −31 | −4 | −26 | −29 | 36 | 2 | −49 | — | — | — | — | — | — |
| Tg (° C.) (Calculated) | — | — | — | — | — | — | — | — | −27 | −4 | −24 | −22 | 44 | −44 |

PREPARATION EXAMPLES 15
Preparation of Copolymer (Y)

A reactor equipped with a stirrer, a condenser, a nitrogen feeding port, a monomer feeding port and a thermometer was charged with 250 parts of pure water, 1.0 part of DSN, 0.5 part of sodium formaldehydesulfoxylate, 0.01 part of EDTA, and 0.0025 part of ferrous sulfate.

The reactor was heated to 65° C. in the nitrogen stream with stirring. After reaching 65° C., to the reactor was continuously added dropwise a mixture comprising 30 parts of PMI, 22 parts of AN, 43 parts of St, 5 parts of aMSt and 0.35 part of CHP for eight hours. At two hours and five hours after starting of DSN adding, respectively 0.5 part of DSN was additionally added.

After adding, stirring was continued at 65° C. for one hour and the polymerization was completed to prepare the copolymer (Y-1). The properties thereof were evaluated. Table 2 shows the results with the composition of monomer.

PREPARATION EXAMPLES 16 TO 23
Preparation of Copolymer (Y)

In the same manner as in copolymer (Y-1), copolymers (Y-2) to (Y-4) and (Y-8) to (Y-12) were prepared by using monomer mixture of which composition was shown in Table 2. The properties thereof were evaluated. Table 2 shows the results.

Polycarbonate (Tg: 145° C.) of bisphenol-A type having a number average molecular weight of 23000 was employed as a copolymer (Y-5). Poly(ethylene terephthalate) (Tm: 267° C.) having a number average molecular weight of 20000 was employed as a copolymer (Y-6). Nylon-6 (Tm: 225° C.) having a number average molecular weight of 25000 was employed as a copolymer (Y-7).

TABLE 2

| | | Copolymer (Y) | | | | | | | | |
|---|---|---|---|---|---|---|---|---|---|---|
| | | Y-1 | Y-2 | Y-3 | Y-4 | Y-8 | Y-9 | Y-10 | Y-11 | Y-12 |
| Composition (Parts) | St | 43 | 20 | 3 | 65 | 7 | 3 | 12 | 10 | 30 |
| | αMSt | 5 | 40 | 70 | — | 48 | 57 | 36 | 60 | 40 |
| | AN | 22 | 25 | 27 | 25 | 18 | 25 | 30 | 30 | — |
| | PMI | 30 | 15 | — | — | 27 | 15 | 22 | — | — |
| | MMA | | | | | — | — | — | — | 30 |
| | BA | — | — | — | 10 | | | | | |
| | tDM | 0.35 | 0.35 | 0.35 | 0.35 | 0.38 | 0.36 | 0.35 | 0.36 | 0.38 |
| | CHP | 0.3 | 0.3 | 0.3 | 0.3 | 0.3 | 0.3 | 0.3 | 0.3 | 0.3 |
| Polymerization conversion (%) | | 99 | 98 | 97 | 98 | 99 | 98 | 99 | 98 | 98 |
| Reduced Viscosity (dl/g) | | 0.61 | 0.58 | 0.56 | 0.60 | 0.58 | 0.62 | 0.60 | 0.58 | 0.56 |
| Tg(° C.) (Measured) | | 154 | 128 | 144 | 86 | | | | | |
| Tg(° C.) (Calculated) | | | | | | 178 | 164 | 159 | 136 | 121 |

PREPARATION EXAMPLE 24
Preparation of (meth)acrylic Ester Copolymer (X) and Copolymer (Y) Preparation of (meth)acrylic Ester Copolymer (X-15)

A reactor equipped with a stirrer, a condenser, a nitrogen feeding port, a monomer feeding port and a thermometer was charged with 250 parts of pure water, 1.0 part of DSN, 0.5 part of sodium formaldehydesulfoxylate, 0.01 part of EDTA, and 0.0025 part of ferrous sulfate.

The reactor was heated to 65° C. in the nitrogen stream with stirring. After reaching 65° C., to the reactor was continuously added dropwise a mixture comprising 50 parts of a monomer mixture of a first step shown in Table 3 (75% by weight of BA, 20% by weight of AN, 5% by weight of St) and 50 parts of tDM and CHP for six hours.

At two hours and four hours after starting of DSN adding, respectively 0.5 part of DSN was additionally added.

After adding, stirring was continued at 65° C. for one hour to complete the polymerization at the first stage (copolymer (X-15). Preparation of copolymer (Y)

A copolymer (Y-13) was prepared in the presence of a copolymer (X-15).

After polymerizing copolymer (X-15), to the reactor was continuously added dropwise a mixture comprising 15 parts of a monomer mixture of a second step shown in Table 4 (a monomer mixture comprising 27% by weight of PMI, 18% by weight of AN, 7% by weight of St and 48% by weight of a MSt, which was employed for the preparation of a copolymer (Y-13)), tDM and CHP for two hours.

After adding, stirring was continued at 65° C. for one hour to complete the polymerization at the second stage to obtain a resin composition comprising a (copolymer (X-15) and a copolymer (Y-13).

Table 3 shows a gel content, a reduced viscosity, Tg and a polymerization conversion at the preparation of the polymer of the obtained copolymer (X-15). And table 4 shows a reduced viscosity, Tg and a polymerization conversion at the preparation of the polymer of the obtained copolymer (Y-13).

PREPARATION EXAMPLES 25 TO 34
Preparation of (meth)acrylic Ester Copolymers (X-8) to (X-20) and Copolymers (-14) to (Y-17)

In the same manner as in a copolymer (X-15) and a copolymer (Y-13), copolymers (X-16) to (X-20) were prepared by using a monomer mixture shown in Table 3. Copolymers (Y-13) to (Y-17) were polymerized by using a monomer mixture syhown in Table 4 to obtain a resin mixture comprising copolymers (X-15) to (X-20) and copolymers (Y-13) to (Y-17) shown in Table 11 and 12. The ratio of a monomer mixture used for the preparation of a copolymer (X) and a monomer mixture used for the preparation of a copolymer (Y) was the values shown in Table 11 and 12. An addition period of the monomer mixture was total eight hours of the first stage and the second stage same as in the preparation of a copolymer (X-15) and a copolymer (X-13). After addition of a monomer at the first stage and at the second stage, one hour additional stirring was carried out respectively.

Table 3 shows a gel content, a reduced viscosity, Tg and a polymerization conversion at the preparation of the polymer of the obtained copolymers (X-16) to (X-20). And table 4 shows a reduced viscosity, Tg and a polymerization conversion at the preparation of the polymer of the obtained copolymers (Y-14) to (Y-17).

TABLE 3

| | (Meth) acrylic ester copolymer (X) | | | | | |
|---|---|---|---|---|---|---|
| | X-15 | X-16 | X-17 | X-18 | X-19 | X-20 |
| Composition (Parts) | | | | | | |
| BA | 75 | 40 | 60 | 70 | 25 | 100 |
| 2EHA | — | 15 | 10 | — | — | — |
| BMA | — | — | 10 | — | — | — |
| MMA | — | — | — | 30 | — | — |

TABLE 3-continued

| | (Meth) acrylic ester copolymer (X) | | | | | |
|---|---|---|---|---|---|---|
| | X-15 | X-16 | X-17 | X-18 | X-19 | X-20 |
| GMA | — | — | — | — | — | — |
| St | 5 | 15 | 5 | — | 30 | — |
| AN | 20 | 30 | 15 | — | 45 | — |
| BDM | — | — | 0.007 | — | — | — |
| ALM | — | — | — | — | — | 2.5 |
| tDM | 0.30 | 0.35 | 0.25 | 0.30 | 0.30 | — |
| CHP | 0.3 | 0.3 | 0.3 | 0.3 | 0.3 | 0.3 |
| Polymerization conversion (%) | 99 | 98 | 99 | 98 | 94 | 99 |
| Gel content (%) | 0 | 0 | 8 | 0 | 0 | 95 |
| Reduced Viscosity (dl/g) | 0.61 | 0.54 | 0.78 | 0.58 | 0.62 | — |
| Tg (° C.) (Calculated) | −27 | −4 | −24 | −22 | 44 | −44 |

TABLE 4

| | Copolymer (Y) | | | | |
|---|---|---|---|---|---|
| | Y-13 | Y-14 | Y-15 | Y-16 | Y-17 |
| Composition (Parts) | | | | | |
| St | 7 | 3 | 12 | 10 | 30 |
| α MSt | 48 | 57 | 36 | 60 | 40 |
| AN | 18 | 25 | 30 | 30 | — |
| PMI | 27 | 15 | 22 | — | — |
| MMA | — | — | — | — | 30 |
| tDM | 0.38 | 0.36 | 0.35 | 0.36 | 0.38 |
| CHP | 0.3 | 0.3 | 0.3 | 0.3 | 0.3 |
| Polymerization conversion (%) | 99 | 98 | 99 | 98 | 98 |
| Reduced Viscosity (dl/g) | 0.59 | 0.61 | 0.62 | 0.57 | 0.56 |
| Tg (° C.) (Calculated) | 178 | 164 | 159 | 136 | 121 |

PREPARATION EXAMPLE 35
Preparation of a Latex (S) of Polymer Containing an Acid Functional Group A latex (S) of polymer containing an acid functional group was prepared as following.

A reactor equipped with a stirrer, a condenser, a nitrogen feeding port, a monomer feeding port and a thermometer was charged with 200 parts of pure water, 0.6 part of DSN, 0.5 part of sodium formaldehydesulfoxylate, 0.01 part of EDTA, and 0.0025 part of ferrous sulfate.

The reactor was heated to 70° C. in the nitrogen stream with stirring. After reaching 70° C., to the reactor was continuously added dropwise a mixture comprising 25 parts of BMA, 5 parts of BA, 0.1 part of tDM and 0.15 part of CHP for two hours, and was added dropwise a mixture comprising 50 parts of BMA, 4 parts of BA, 16 parts of MAA, 0.5 part of tDM and 0.15 part of CHP for four hours.

After adding, stirring was continued at 70° C. for one hour to complete the polymerization. A latex (S) of polymer containing an acid functional group was obtained.

PREPARATION EXAMPLE 36
Preparation of a Rubber Polymer Having Non-enhanced Particle Size (a-1)

A latex of a rubber polymer having non-enhanced particle size (a-1) was prepared as the following method.

A 100L polymerization reactor was charged with 230 parts of pure water, 0.2 part of potassium persulfate and 0.2 part of tDM.

After removing air in the polymerization reactor by a vacuum pump, the reactor was further charged with 0.6 part of sodium oleate, 2 parts of sodium rosilate and 100 parts of butadiene.

The system was heated up to 60° C. to start the polymerization. The polymerization was finished in 25 hours.

The polymerization conversion was 96%. The obtained latex of a rubber polymer having non-enhanced particle size (a-1) had a volume average particle size of 85 nm.

PREPARATION EXAMPLE 37
Preparation of a Rubber Polymer Having Non-enhanced Particle Size (a-2)

A latex of a rubber polymer having non-enhanced particle size (a-2) was prepared as the following method.

A reactor equipped with a stirrer, a condenser, a nitrogen feeding port, a monomer feeding port and a thermometer was charged with 200 parts of pure water and 0.55 part of sodium paltimate.

The reactor was heated to 60° C. in the nitrogen stream with stirring. After heating, the reactor was charged with 0.3 part of sodium formaldehyde sulfoxylate, 0.0025 part of ferrous sulfate and 0.01 part of EDTA.

To the reactor was added dropwise a mixture comprising 98.5 parts of BA, 1.5 parts of TAC and 0.3 part of CHP for six hours. After adding, the stirring was continued at 60° C. for one hour to complete the polymerization. At 1.5 hour after starting the mixture addition, 0.3 part of sodium paltimate was added. And at 4 hours after starting the mixture addition, 0.35 part of sodium paltimate was added.

The polymerization conversion was 98%. The obtained latex of a rubber polymer having non-enhanced particle size (a-2) had a volume average particle size of 92 nm.

PREPARATION EXAMPLE 38
Preparation of a Rubber Polymer Having Non-enhanced Particle Size A latex of a rubber polymer having non-enhanced particle size (a-3) was prepared as the following method.

A latex of an organosiloxane was obtained by emulsion dispersion of 200 parts of pure water, 1 part of sodium dodecyl benzene sulfonate, 100 parts of octamethylcyclotetrasiloxane, 2 parts of tetraethoxysilane and 0.5 part of γ-methacryloyloxypropyldimethoxymethylsilane by using a homogenizer.

After removing air and nitrogen-substitution, the polymerization reactor was charged a latex of the above organosiloxane. The reactor was heated to 80° C., and 0.2 part of dodecyl benzene sulfonate was added. After stirring for five hours, the reactor was kept at 23° C. for 24 hours. After that, the reactor was neutralized by sodium hydroxide to complete the polymerization.

The polymerization conversion was 90%. The obtained latex of a rubber polymer having non-enhanced particle size (a-3) had a volume average particle diameter of 130 nm.

PREPARATION EXAMPLE 39
Preparation of a Rubber Polymer Having Enhanced Particle Size A latex of a rubber polymer having enhanced particle size (A-1) was prepared by using a latex of a rubber polymer having non-enhanced particle size (a-1) and a latex (S) of a polymer containing an acid functional group.

After adding 3.5 parts (solid) of a latex (S) containing an acid functional group to 100 parts (solid) of a latex of a rubber polymer having non-enhanced particle size (a-1) at 60° C., the stirring was continued for one hour to enhance the particle size. Then a latex of a rubber polymer having enhanced particle size (A-1) was prepared.

The obtained latex of a rubber polymer having enhanced particle size (A-1) had a volume average particle size of 450 nm.

PREPARATION EXAMPLE 40
Preparation of a Rubber Polymer Having Enhanced Particle Size Except for using 2.0 parts (solid) of a latex (S) of a polymer containing an acid functional group, a latex of a rubber polymer having enhanced particle size (A-2) was prepared in the same manner as Preparation Example 40.

The obtained latex of a rubber polymer having enhanced particle size (A-1) had a volume average particle diameter of 610 nm.

PREPARATION EXAMPLE 41
Preparation of a Rubber Polymer Having Enhanced Particle Size By using a latex of a rubber polymer having non-enhanced particle size (a-2) and a latex (S) of a polymer containing an acid functional group which were prepared above, a latex of an acrylic ester rubber polymer having enhanced particle size (A-3) was prepared.

After adding 3.5 parts (solid) of a latex (S) containing an acid functional group to 100 parts (solid) of a latex of a rubber polymer having non-enhanced particle size (a-2) at 60° C., the stirring was continued for one hour to enhance the particle size, and a latex of a rubber polymer having enhanced particle size (A-3) was prepared.

The obtained latex of a rubber polymer having enhanced particle size (A-3) had a volume average particle diameter of 350 nm.

PREPARATION EXAMPLE 42
Preparation of a Rubber Polymer Having Enhanced Particle Size By using a latex of a rubber polymer having non-enhanced particle size (a-1), a latex of a rubber polymer having non-enhanced particle size (a-2), and a latex (S) of a polymer containing an acid functional group, which were prepared above, a latex of a rubber polymer having enhanced particle size (A-4) was prepared.

After adding 2.4 parts (solid) of a latex (S) containing an acid functional group to 50 parts (solid) of a latex of a rubber polymer having non-enhanced particle size (a-1) and 50 parts (solid) of a latex of a rubber polymer having non-enhanced particle size (a-2) at 60° C., the stirring was continued for one hour to enhance the particle size.

The obtained latex of a rubber polymer having enhanced particle size (A-4) had a volume average particle diameter of 520 nm.

PREPARATION EXAMPLE 43 and 44
Preparation of a Rubber Polymer Having Enhanced Particle Size By using a latex of a rubber polymer having non-enhanced particle size (a-2), a latex of a rubber polymer having non-enhanced particle size (a-3) and a latex (S) of a polymer containing an acid functional group, which were prepared above, a latex of a rubber polymer having enhanced particle size (A-5) and a latex of a rubber polymer having enhanced particle size (A-6) were prepared.

The obtained latex of a rubber polymer having enhanced particle size (A-5) had a volume average particle diameter of 380 nm and the obtained latex of a rubber polymer having enhanced particle size (A-6) had a volume average particle diameter of 270 nm.

The compositions of the polymers employed and the volume average particle diameter of the obtained rubber polymers having enhanced particle size in Preparation Examples 40 to 45 are summarized in Table 5.

TABLE 5

|  | Rubber polymer having enhanced particle size | | | | | |
|---|---|---|---|---|---|---|
|  | A-1 | A-2 | A-3 | A-4 | A-5 | A-6 |
| Composition (Parts) | | | | | | |
| Rubber polymer having non-enhanced particle size (a-1) | 100 | 100 | — | 50 | — | — |
| Rubber polymer having non-enhanced particle size (a-2) | — | — | 100 | 50 | 100 | 70 |

TABLE 5-continued

|  | Rubber polymer having enhanced particle size | | | | | |
|---|---|---|---|---|---|---|
|  | A-1 | A-2 | A-3 | A-4 | A-5 | A-6 |
| Rubber polymer having non-enhanced particle size (a-3) | — | — | — | — | — | 30 |
| Latex (S) containing an acid functional group | 3.5 | 2.0 | 3.5 | 2.4 | 3.2 | 3.5 |
| Volume average particle size (nm) | 450 | 610 | 350 | 520 | 380 | 270 |

PREPARATION EXAMPLE 45

Preparation of a Graft Copolymer Z

A reactor equipped with a stirrer, a condenser, a nitrogen feeding port, a monomer feeding port and a thermometer was charged with 280 parts of pure water, 65 parts (solid) of a latex of a rubber polymer having enhanced particle size (A-1), 0.3 part of sodium formaldehyde sulfoxylate, 0.01 part of EDTA and 0.0025 part of ferrous sulfate.

The reactor was heated to 60° C. in the nitrogen stream with stirring. After reaching 60° C., to the reactor was continuously added dropwise a mixture comprising 11 parts of AN, 24 parts of St and 0.2 part of CHP for five hours.

After adding, the stirring was continued at 60° C. for two hours to complete the polymerization, and a latex of a graft copolymer (Z-1) was prepared.

PREPARATION EXAMPLE 46 to 54

Preparation of a Graft Copolymer Z

By using a rubber polymer (A) and a vinyl monomer (B) having 20 composition shown in Table 6, each latex of graft copolymers (Z-2) to (Z-10) were prepared in the same manner as in Preparation Example 45.

The composition and the polymerization conversion of a rubber polymer (A) and a vinyl monomer (B) employed in Preparation Examples 46 to 54 are summarized in Table 6.

TABLE 6

|  |  | Graft copolymer (Z) | | | | | | | | | |
|---|---|---|---|---|---|---|---|---|---|---|---|
|  |  | Z-1 | Z-2 | Z-3 | Z-4 | Z-5 | Z-6 | Z-7 | Z-8 | Z-9 | Z-10 |
|  | Composition (Parts) | | | | | | | | | | |
| Rubber polymer (A) and (a) | A-1 | 65 | — | — | — | 60 | — | — | — | — | — |
|  | A-2 | — | 80 | — | — | — | 75 | — | — | — | — |
|  | A-3 | — | — | 55 | — | — | — | 50 | — | — | — |
|  | A-4 | | | | | — | — | — | 65 | — | — |
|  | A-5 | | | | | — | — | — | — | 60 | — |
|  | A-6 | | | | | — | — | — | — | — | 50 |
|  | a-1 | — | — | — | 50 | | | | | | |
| Vinyl monomer (B) | AN | 11 | 5 | 12 | 15 | 10 | 5 | 12 | 10 | 10 | 12 |
|  | St | 24 | 5 | 33 | 35 | 30 | 5 | 38 | 35 | 20 | 38 |
|  | MMA | — | 10 | — | — | — | 15 | — | — | 10 | — |
| Others | CHP | 0.2 | 0.2 | 0.3 | 0.3 | 0.2 | 0.2 | 0.3 | 0.2 | 0.2 | 0.3 |
| Polymerization conversion (%) |  | 98 | 97 | 98 | 99 | 98 | 97 | 98 | 98 | 99 | 98 |

EXAMBLES 1 TO 11 AND COMPARATIVE EXAMPLES 1 TO 9

Preparation of Thermoplastic Resin Composition

A latex of a (meth)acrylic ester copolymer (X), a latex of a copolymer (Y) and an optional latex of a graft copolymer (Z) which were prepared in the above Preparation Examples were mixed in the ratio of a pre-determined amount (solid) shown in Tables 7 and 8. After a phenolic anti-oxidant was added, calcium chloride was added to coagulate. A coagulated slurry was heated and dried to obtain a powder of a resin composition comprising (X), (Y) and ((Z)). To the composition was added 1 part of ethylenebisstearylamide, and the mixture was blended homogeneously by using 20L blender available from Tabata Kikai Kabushiki Kaisha. And the mixture was melted and kneaded at 240° C. by using an extrusion machine available from Tabata Kikai Kabushiki Kaisha to prepare a pellet of a thermoplastic resin composition (Examples 1 to 8 and Comparative Examples 1 to 6). The temperature was 270° C. in Example 9 and Comparative Example 7, 260° C. in Example 10 and Comparative Example 8 and 285° C. in Example 11 and Comparative Example 9. In Examples 9 to 10 and Comparative Examples 7 to 8, 1 part of stearylstearate was mixed instead of ethylenebisstearylamide. Resin properties of each resin composition are evaluated and described in Tables 7 and 8.

TABLE 7

| | | (Meth)acrylic ester copolymer (X) | | Copolymer (Y) | | Graft copolymer (Z) | | Hardness | Permanent compressive strain | Tensile strength | Tensile elongation | Deformation at heating | Moldability |
|---|---|---|---|---|---|---|---|---|---|---|---|---|---|
| Example | 1 | X-1 | 70 | Y-1 | 30 | — | — | 65 | 58 | 55 | 155 | ○ | ○ |
| | 2 | X-2 | 60 | Y-3 | 40 | — | — | 74 | 60 | 62 | 150 | ○ | ○ |
| | 3 | X-5 | 55 | Y-1 | 45 | — | — | 88 | 66 | 85 | 195 | ○ | ○ |
| | 4 | X-1 | 40 | Y-1 | 20 | Z-1 | 40 | 78 | 61 | 50 | 245 | ○ | ○ |
| | 5 | X-2 | 35 | Y-2 | 35 | Z-2 | 30 | 89 | 68 | 95 | 190 | ○ | ○ |
| | 6 | X-3 | 65 | Y-3 | 20 | Z-3 | 15 | 67 | 56 | 65 | 280 | ○ | ○ |
| | 7 | X-4 | 50 | Y-4 | 20 | Z-4 | 30 | 73 | 58 | 75 | 290 | ○ | ○ |
| | 8 | X-5 | 45 | Y-1 | 10 | Z-1 | 45 | 74 | 59 | 78 | 260 | ○ | ○ |
| Comparative example | 1 | X-7 | 95 | Y-1 | 5 | — | — | 98 | 88 | 150 | 120 | X | X |
| | 2 | — | — | Y-1 | 100 | — | — | 100< | 94 | 830 | 3 | ○ | X |
| | 3 | X-6 | 40 | Y-1 | 20 | Z-1 | 40 | 100< | 92 | 160 | 90 | ○ | X |
| | 4 | X-7 | 40 | Y-1 | 20 | Z-1 | 40 | 100< | 93 | 25 | 35 | ○ | X |
| | 5 | X-8 | 40 | Y-1 | 20 | Z-1 | 40 | 100< | 92 | 170 | 220 | ○ | X |
| | 6 | — | — | Y-1 | 60 | Z-1 | 40 | 100< | 94 | 380 | 40 | ○ | X |

TABLE 8

| | | (Meth)acrylic ester copolymer (X) | | Copolymer (Y) | | | | Graft copolymer (Z) | | Hardness | Tensile strength | Tensile elongation | Deformation at heating | Moldability |
|---|---|---|---|---|---|---|---|---|---|---|---|---|---|---|
| Example | 9 | X-1 | 40 | Y-5 | 20 | Y-1 | 5 | Z-1 | 35 | 86 | 75 | 310 | ○ | ○ |
| | 10 | X-1 | 40 | Y-6 | 40 | Y-1 | 5 | Z-2 | 35 | 91 | 95 | 210 | ○ | ○ |
| | 11 | X-1 | 40 | Y-7 | 20 | Y-1 | 5 | Z-3 | 35 | 90 | 93 | 240 | ○ | ○ |
| Comparative example | 7 | — | — | Y-5 | 50 | Y-1 | 15 | Z-1 | 35 | 100< | 540 | 45 | ○ | X |
| | 8 | — | — | Y-6 | 50 | Y-1 | 15 | Z-1 | 35 | 100< | 550 | 35 | ○ | X |
| | 9 | — | — | Y-7 | 50 | Y-1 | 15 | Z-1 | 35 | 100< | 520 | 65 | ○ | X |

EXAMPLES 12 TO 17 AND COMPARATIVE EXAMPLES 10 TO 14

Preparation and Evaluation of Interior Parts of Vehicles

A latex of a (meth)acrylic ester copolymer (X), a latex of a copolymer (Y) and an optional latex of a graft copolymer (Z) which were prepared in the above Preparation Examples were mixed in the ratio of a pre-determined amount (solid) shown in Table 9 and 10. After 0.5 part of a phenolic anti-oxidant (made by Chiba Gaigy Ltd.) was added, calcium chloride was added to coagulate.

A coagulated slurry was heated and dried to obtain a powder of a flexible resin composition comprising (X), (Y) and (Z). To the composition was added 0.3 part of a stabilizing agent of hinderedamine group (LS-770 made by Asahi Denka Kogyo Kabushiki Kaisha), 1 part of ethylenebisstearylamide and 1.2 parts of a black pigment. And the mixture was blended homogeneously by using 20L blender available from Tabata Kikai Kabushiki Kaisha. And the mixture was kneaded at 240° C. by using a 40 m/m extrusion machine with a single screw available from Tabata Kikai Kabushiki Kaisha to prepare a pellet of a flexible resin composition. After that, by using the pellet, interior parts of vehicles (trim molded articles of automobiles 1 having a cross section described in FIG. 1) were prepared by an extrusion molding.

The above evaluation was carried out by using the obtained flexible resin composition and the obtained interior parts of vehicles. The results are described in Table 9 and 10.

TABLE 9

| | Composition of flexible resin composition (Parts) | | | | | | Property of flexible resin composition | | | |
|---|---|---|---|---|---|---|---|---|---|---|
| | (Meth)acrylic ester copolymer (X) | | Copolymer (Y) | | Graft copolymer (Z) | | Surface hardness | Permanent compressive strain | Tensile strength (kg/cm$^2$) | Tensile elongation (%) |
| Ex. No. | Kinds | Amount (Parts) | Kinds | Amount (Parts) | Kinds | Amount (Parts) | | | | |
| 12 | X-9 | 45 | Y-8 | 15 | Z-5 | 40 | 81 | 58 | 82 | 225 |
| 13 | X-10 | 65 | Y-11 | 25 | Z-7 | 10 | 86 | 64 | 88 | 157 |

TABLE 9-continued

| | Composition of flexible resin composition (Parts) | | | | | | Property of flexible resin composition | | | |
|---|---|---|---|---|---|---|---|---|---|---|
| | (Meth)acrylic ester copolymer (X) | | Copolymer (Y) | | Graft copolymer (Z) | | Surface hardness | Permanent compressive strain | Tensile strength (kg/cm$^2$) | Tensile elongation (%) |
| | Kinds | Amount (Parts) | Kinds | Amount (Parts) | Kinds | Amount (Parts) | | | | |
| 14 | X-11 | 55 | Y-9 | 20 | Z-6 | 25 | 73 | 56 | 75 | 185 |
| 15 | X-12 | 45 | Y-12 | 20 | Z-6 | 35 | 85 | 62 | 83 | 175 |
| 16 | X-9 | 60 | Y-10 | 20 | Z-7 | 20 | 69 | 53 | 67 | 167 |
| 17 | X-10 | 75 | Y-8 | 25 | — | — | 65 | 50 | 55 | 114 |
| Com. Ex. No. | | | | | | | | | | |
| 10 | X-13 | 45 | Y-8 | 15 | Z-5 | 40 | 100< | 92 | 115 | 46 |
| 11 | X-14 | 45 | Y-8 | 15 | Z-5 | 40 | 100< | 89 | 95 | 85 |
| 12 | — | — | Y-8 | 30 | Z-5 | 70 | 100< | 91 | 205 | 73 |
| 13 | X-10 | 95 | Y-8 | 5 | — | — | 78 | 53 | 58 | 95 |
| 14 | X-9 | 5 | Y-8 | 30 | Z-5 | 65 | 100< | 90 | 265 | 65 |

TABLE 10

| | Composition of flexible resin composition (Parts) | | | | | | Property of interior parts of vehicles | | | | |
|---|---|---|---|---|---|---|---|---|---|---|---|
| | (Meth)acrylic ester copolymer (X) | | Copolymer (Y) | | Graft copolymer (Z) | | Test at a room temperature | | Tests at a high temperature | | |
| | Kinds | Amount (Parts) | Kinds | Amount (Parts) | Kinds | Amount (Parts) | Surface appearance | Adhesiveness | Shape change | Surface appearance | Adhesiveness |
| Ex. No. | | | | | | | | | | | |
| 12 | X-9 | 45 | Y-8 | 15 | Z-5 | 40 | ○ | ○ | ○ | ○ | ○ |
| 13 | X-10 | 65 | Y-11 | 25 | Z-7 | 10 | ○ | ○ | ○ | ○ | ○ |
| 14 | X-11 | 55 | Y-9 | 20 | Z-6 | 25 | ○ | ○ | ○ | ○ | ○ |
| 15 | X-12 | 45 | Y-12 | 20 | Z-6 | 35 | ○ | ○ | ○ | ○ | ○ |
| 16 | X-9 | 60 | Y-10 | 20 | Z-7 | 20 | ○ | ○ | ○ | ○ | ○ |
| 17 | X-10 | 75 | Y-8 | 25 | — | — | ○ | ○ | ○ | ○ | ○ |
| Com. Ex. No. | | | | | | | | | | | |
| 10 | X-13 | 45 | Y-8 | 15 | Z-5 | 40 | ○ | ○ | ○ | ○ | ○ |
| 11 | X-14 | 45 | Y-8 | 15 | Z-5 | 40 | X | ○ | ○ | X | ○ |
| 12 | — | — | Y-8 | 30 | Z-5 | 70 | X | ○ | ○ | X | ○ |
| 13 | X-10 | 95 | Y-8 | 5 | — | — | ○ | X | X | ○ | X |
| 14 | X-9 | 5 | Y-8 | 30 | Z-5 | 65 | X | ○ | ○ | X | ○ |

EXAMPLES 18 TO 23 AND COMPARATIVE EXAMPLES 15 TO 19

Preparation and Evaluation of Exterior Parts of Vehicles

A latex of a (meth)acrylic ester copolymer (X), a latex of a copolymer (Y) and an optional latex of a graft copolymer (Z) which were prepared in the above Preparation Examples were mixed in the ratio of a pre-determined amount (solid) shown in Table 11 and 12. After 0.5 part of a phenolic anti-oxidant (made by Chiba Gaigy Ltd.) was added, calcium chloride was added to coagulate.

A coagulated slurry was heated and dried to obtain a powder of a flexible resin composition comprising (X), (Y) and (Z). To the composition was added 1 part of ethylenebisstearylamide, 0.3 part of tinuvin P (made by Chiba Gaigy Ltd.), 0.3 part of sanor LS-63 (made by Sankyo Co., Ltd.) and 1.5 parts of a black pigment. And the mixture was blended homogeneously by using 20L blender available from Tabata Kikai Kabushiki Kaisha.

The mixture was kneaded at 240° C. by using a 40 m/m extrusion machine with a single screw available from Tabata Kikai Kabushiki Kaisha to prepare a pellet of a flexible resin composition.

Figure 2:
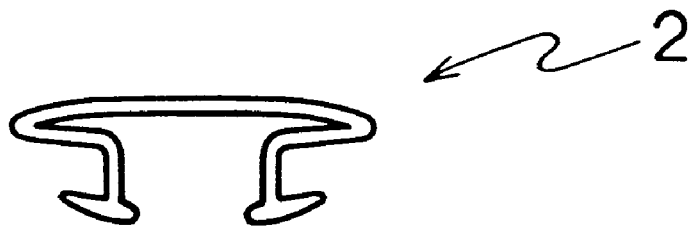
FIG. 2 is a cross sectional view of exterior parts for vehicles (a drip rail molding of automobiles) prepared in Examples 18 to 23 and Comparative Examples 15 to 19.

After that, by using the pellet, exterior parts of vehicles (drip rail molding of automobiles 2 having a cross section described in FIG. 2) were prepared by an extrusion molding.

The above evaluation was carried out by using the obtained flexible resin composition and the obtained exterior parts of vehicles. The results are described in Table 11 and 12.

TABLE 11

| | Composition of flexible resin composition (Parts) | | | | | | Property of flexible resin composition | | | |
|---|---|---|---|---|---|---|---|---|---|---|
| | (Meth)acrylic ester copolymer (X) | | Copolymer (Y) | | Graft copolymer (Z) | | Surface hardness | Permanent compressive strain | Tensile strength (kg/cm$^2$) | Tensile elongation (%) |
| | Kinds | Amount (Parts) | Kinds | Amount (Parts) | Kinds | Amount (Parts) | | | | |
| Ex. No. | | | | | | | | | | |
| 18 | X-15 | 50 | Y-13 | 15 | Z-8 | 35 | 83 | 59 | 85 | 215 |
| 19 | X-16 | 65 | Y-16 | 30 | Z-10 | 5 | 87 | 66 | 91 | 146 |
| 20 | X-17 | 55 | Y-14 | 15 | Z-9 | 30 | 74 | 59 | 78 | 205 |
| 21 | X-18 | 45 | Y-17 | 15 | Z-9 | 40 | 84 | 64 | 86 | 197 |
| 22 | X-15 | 60 | Y-15 | 25 | Z-10 | 15 | 71 | 55 | 75 | 173 |
| 23 | X-16 | 70 | Y-13 | 30 | — | — | 68 | 53 | 59 | 112 |
| Com. Ex. No. | | | | | | | | | | |
| 15 | X-19 | 50 | Y-13 | 15 | Z-8 | 35 | 100< | 91 | 118 | 42 |
| 16 | X-20 | 50 | Y-13 | 15 | Z-8 | 35 | 100< | 90 | 98 | 81 |
| 17 | — | — | Y-8 | 30 | Z-8 | 70 | 100< | 91 | 205 | 73 |
| 18 | X-16 | 95 | Y-13 | 5 | — | — | 81 | 57 | 60 | 94 |
| 19 | X-15 | 5 | Y-13 | 30 | Z-8 | 65 | 100< | 91 | 275 | 62 |

TABLE 12

| | Composition of flexible resin composition (Parts) | | | | | | Property of exterior parts of vehicles | | | | |
|---|---|---|---|---|---|---|---|---|---|---|---|
| | (Meth)acrylic ester copolymer (X) | | Copolymer (Y) | | Graft copolymer (Z) | | Surface appearance | Test at a high temperature | | Wetherability tests | |
| | | | | | | | | Shape change | Adhesiveness | Surface change | Color difference |
| | Kinds | Amount (Parts) | Kinds | Amount (Parts) | Kinds | Amount (Parts) | | | | | |
| Ex. No. | | | | | | | | | | | |
| 18 | X-15 | 50 | Y-13 | 15 | Z-8 | 35 | ○ | ○ | ○ | ○ | 0.5 |
| 19 | X-16 | 65 | Y-16 | 30 | Z-10 | 5 | ○ | ○ | ○ | ○ | 0.2 |
| 20 | X-17 | 55 | Y-14 | 15 | Z-9 | 30 | ○ | ○ | ○ | ○ | 0.3 |
| 21 | X-18 | 45 | Y-17 | 15 | Z-9 | 40 | ○ | ○ | ○ | ○ | 0.4 |
| 22 | X-15 | 60 | Y-15 | 25 | Z-10 | 15 | ○ | ○ | ○ | ○ | 0.2 |
| 23 | X-16 | 70 | Y-13 | 30 | — | — | ○ | ○ | ○ | ○ | 0.2 |
| Com. Ex. No. | | | | | | | | | | | |
| 15 | X-19 | 50 | Y-13 | 15 | Z-8 | 35 | ○ | ○ | ○ | X | 2.4 |
| 16 | X-20 | 50 | Y-13 | 15 | Z-8 | 35 | X | ○ | ○ | ○ | 0.6 |
| 17 | — | — | Y-8 | 30 | Z-8 | 70 | X | ○ | ○ | X | 4.8 |
| 18 | X-16 | 95 | Y-13 | 5 | — | — | ○ | X | X | ○ | 0.4 |
| 19 | X-15 | 5 | Y-13 | 30 | Z-8 | 65 | X | ○ | ○ | X | 4.5 |

From the results in Tables 7 and 8, the thermoplastic resin composition in the present invention is excellent especially in flexibility (hardness is low), tensile strength, tensile elongation and heat deformation property, and also molding thereby is easy.

From the results in Table 9 and 10, it is seen that the interior parts of automobiles of the present invention represented in Examples 12 to 17 are excellent in flexibility, surface appearance and heat deformation property, and have having low tackiness at a high temperature. From the results of Table 11 and 12, it is seen that the exterior parts of automobiles of the present invention represented in Examples 18 to 23 are excellent in flexibility, surface appearance, weatherability and heat deformation property, and have low tackiness at a high temperature.

What we claim is:
1. A thermoplastic resin composition comprising 25 to 90 parts by weight of a (meth)acrylic ester copolymer (X), which is prepared by polymerizing 40 to 95% by weight of a (meth)acrylic ester, 0 to 40% by weight of a vinyl cyanide compound, not more than 60% by weight of an aromatic vinyl compound and 0 to 40% by weight of a monomer copolymerizable therewith, and has a glass transition temperature of not more than 20° C. and a gel content of not more than 50% by weight,

5 to 75 parts by weight of a copolymer (Y), which has a glass transition temperature or a melting point not less than 50° C., and 0 to 70 parts by weight of a graft copolymer (Z), which is prepared by polymerizing 5 to 95% by weight of a rubber polymer (A) and 5 to 95% by weight of a vinyl monomer (B), wherein the total weight of the copolymers (X), (Y) and (Z) is 100 parts by weight, and wherein hardness thereof at 20° C. measured by the method of JIS K6301 is 45 to 97.

2. The thermoplastic resin composition of claim 1, wherein the content of the graft copolymer (Z) is 5 to 65 parts by weight.

3. The thermoplastic resin composition of claim 1, wherein the copolymer (Y) is at least one thermoplastic resin selected from the group consisting of a styrene resin, a vinyl chloride resin, an acrylic resin, polycarbonate, an amide resin, an ester resin and an olefin resin.

4. The thermoplastic resin composition of claim 1, wherein the copolymer (Y) is a styrene resin which is prepared by polymerizing 0 to 40% by weight of a vinyl cyanide compound, 10 to 95% by weight of an aromatic vinyl compound, 0 to 50% by weight of maleimide monomer and 0 to 40% by weight of a monomer copolymerizable therewith.

5. The thermoplastic resin composition of claim 1, wherein the graft copolymer (Z) is prepared by polymerizing 5 to 95 parts by weight of at least one rubber polymer (A) selected from the group consisting of a diene rubber polymer, an olefin rubber polymer, an acrylic rubber polymer and a silicone rubber polymer, which has a volume average particle size of 30 to 2,000 nm, and 5 to 95 parts by weight of a monomer mixture comprising 5 to 90% by weight of an aromatic vinyl compound, 10 to 95% by weight of at least one monomer selected from the group consisting of a (meth)acrylic ester and a vinyl cyanide compound, and 0 to 30% by weight of a monomer copolymerizable therewith.

6. Interior or exterior parts for vehicles comprising 25 to 90 parts by weight of a (meth)acrylic ester copolymer (X), which has a glass transition temperature of not more than 20° C. and a gel content of not more than 50% by weight, 5 to 75 parts by weight of a copolymer (Y) which has a glass transition temperature of not less than 50° C., and 0 to 70 parts by weight of a graft copolymer (Z) which is prepared by polymerizing 5 to 95% by weight of a rubber polymer (A) and 5 to 95% by weight of a vinyl monomer (B), wherein the total weight of the copolymers (X), (Y) and (Z) is 100 parts by weight, and surface hardness of an article molded thereof is 30 to 100, which is measured by the method of JIS K6301 at 20° C.

7. The interior or exterior parts for vehicles of claim 6, wherein the (meth)acrylic ester copolymer (X) is prepared by polymerizing 40 to 95% by weight of a (meth)acrylic ester, 0 to 60% by weight of an aromatic vinyl compound, 0 to 40% by weight of a vinyl cyanide compound and 0 to 40% by weight of a monomer copolymerizable therewith.

8. The interior or exterior parts for vehicles of claim 6, wherein the copolymer (Y) is prepared by polymerizing 10 to 95% by weight of an aromatic vinyl compound, 0 to 45% by weight of a vinyl cyanide compound, 0 to 50% by weight of a maleimide monomer and 0 to 40% by weight of a monomer copolymerizable therewith.

9. The interior or exterior parts for vehicles of claim 6, wherein the graft copolymer (Z) is prepared by polymerizing 5 to 95 parts by weight of at least one rubber polymer (A) selected from the group consisting of a diene rubber polymer, an olefin rubber polymer, an acrylic rubber polymer and a silicone rubber polymer, which has a volume average particle size of 30 to 2,000 nm, and 5 to 95 parts by weight of a vinyl monomer (B) comprising 5 to 90% by weight of an aromatic vinyl compound, 10 to 95% by weight of at least one monomer selected from the group consisting of a (meth)acrylic ester and a vinyl cyanide compound, and 0 to 30% by weight of a monomer copolymerizable therewith.

\* \* \* \* \*